United States Patent [19]

Koch et al.

[11] Patent Number: 4,698,775
[45] Date of Patent: Oct. 6, 1987

[54] SELF-CONTAINED MOBILE REPROGRAMMABLE AUTOMATION DEVICE

[75] Inventors: George R. Koch, Los Altos; Michael Krolak, Los Gatos; Michael R. Biche, Newark, all of Calif.

[73] Assignee: Flexible Manufacturing Systems, Inc., Los Gatos, Calif.

[21] Appl. No.: 735,468

[22] Filed: May 17, 1985

[51] Int. Cl.⁴ ............................................. G06F 15/50
[52] U.S. Cl. ..................................... 364/478; 364/513; 414/265; 414/909; 901/1; 901/46; 901/47
[58] Field of Search ................. 364/460–461, 364/478, 513; 901/1, 46–47, 50; 414/265, 279, 909, 920

[56] References Cited

U.S. PATENT DOCUMENTS

| | | | |
|---|---|---|---|
| 3,086,465 | 4/1963 | Montfort | 414/909 X |
| 3,973,685 | 8/1976 | Loomer | 901/1 X |
| 4,119,900 | 10/1978 | Kremnitz | 901/1 X |
| 4,239,434 | 12/1980 | Gannon | 364/478 X |
| 4,283,165 | 8/1981 | Vertut | 901/1 X |
| 4,307,891 | 12/1981 | Doornick et al. | 901/1 X |
| 4,425,751 | 1/1984 | Bousseau et al. | 901/1 X |
| 4,472,783 | 9/1984 | Johnstone et al. | 364/478 X |
| 4,500,970 | 2/1985 | Daemmer | 364/513 |
| 4,545,106 | 10/1985 | Juengel | 364/513 X |

OTHER PUBLICATIONS

Marce et al., "An Autonomous Computer-Controlled Vehicle", L.A.T.E.A. Institut National des Sciences Appliquées, France, Oct. 1983, pp. 113–122.
J. Gupton, "Nuclear Power Plant Emergency Damage Control Robot", *Robotics Age*, Mar./Apr. 1983, pp. 18–21.

*Primary Examiner*—Gary V. Harkcom
*Attorney, Agent, or Firm*—Thomas E. Schatzel

[57] ABSTRACT

A mobile transport unit for independently operating within an enclosed environment. The transport unit is adapted for carrying a robotic manipulator arm and cargo within the environment, and includes an infrared communications transmitter/receiver for communicating with an extra-vehicular central processing unit. The transport unit includes electric motors for driving and for steering the unit. A laser docking module precisely determines the vehicle's location relative to a fixed point within the environment. Ultrasonic sensors placed about the vehicle can detect objects within a preselected range for collision avoidance and safety purposes. The vehicle is controlled by a central computer which receives inputs from the infrared communications system and from on-board sensors including directional sensors, distance measuring sensors, a gyroscope, the ultrasonic sensors, and the docking module. The on-board computer directs the vehicle and the robotic arm based on information received from these inputs, and allows for the continuous operation of the vehicle without recalibration. Power is supplied to the vehicle by an on-board battery pack, and the vehicle is enclosed by a protective skin for reasons of cleanliness and safety, and to prevent turbulent airflow around the wafer cassettes and the robotic arm.

8 Claims, 6 Drawing Figures

Fig_1

Fig_2

Fig_3

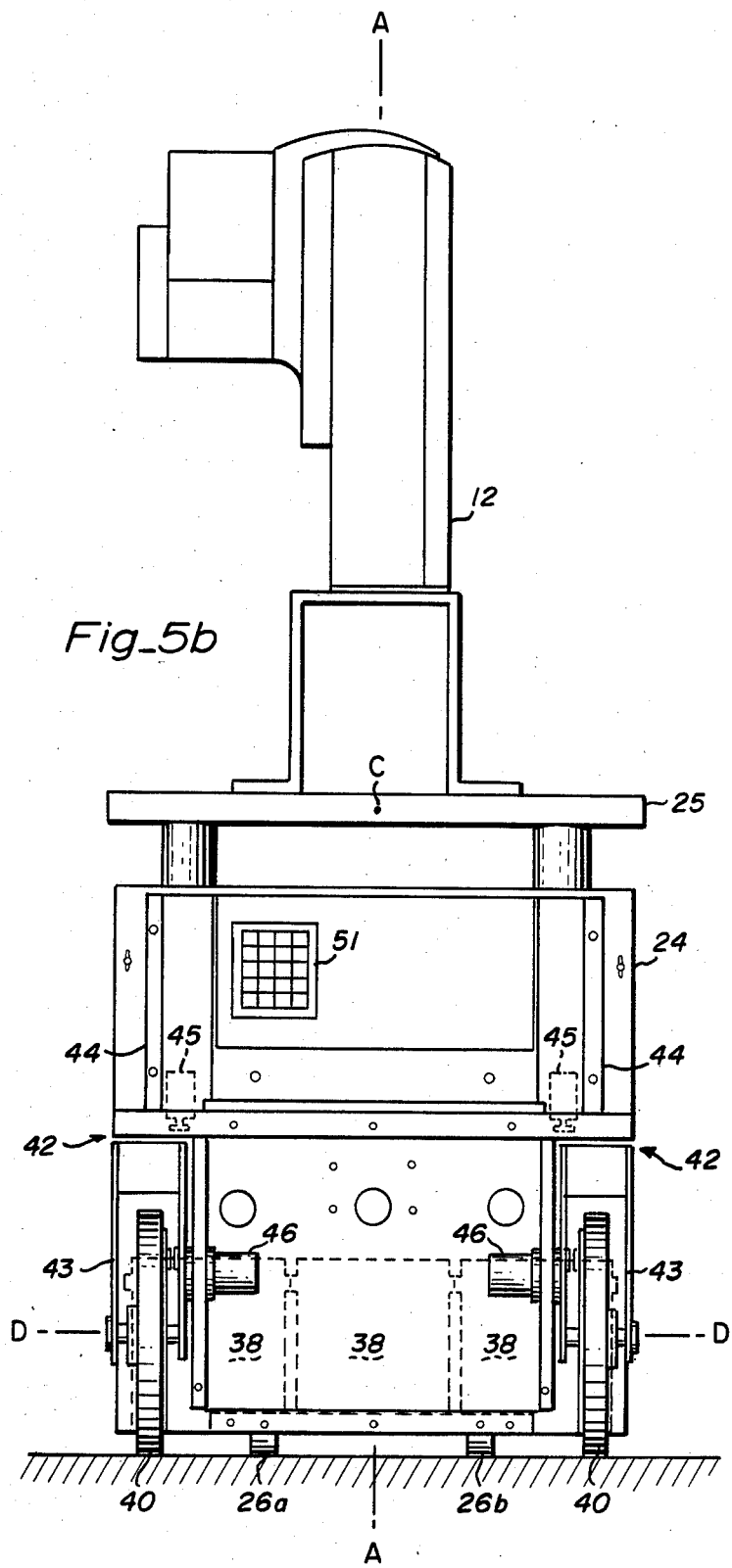
Fig_5b

SELF-CONTAINED MOBILE REPROGRAMMABLE AUTOMATION DEVICE

BACKGROUND OF THE INVENTION

1. Field of the Invention

The present invention relates generally to reprogrammable automation devices, and more particularly to a self-contained mobile reprogrammable automation device

2. Description of the Prior Art

The automatic transportation of particular objects from point to point within an enclosed environment is desirable in a number of commercial, industrial, medical, and scientific settings. One such illustrative situation includes the transportation of cassettes filled with silicon wafers from machine to machine in a clean room of a semiconductor chip fabrication facility. Subsequent processing of the chips, for example encapsulation of the chips, may also be performed in a clean room and/or under semi-automatic conditions. Transportation of biohazardous or radioactive materials under commercial, industrial or research conditions is also common. The environments in which these materials are found and utilized typically constitute single large rooms, for example clean rooms or isolation rooms, which are maintained under controlled environmental conditions. Human manipulation is often contraindicated for reason of safety, cleanliness, labor costs, or to preclude handling mishaps.

These environments may have a number of machines, at fixed locations within the room, to which and from which objects must be transported. In the semiconductor chip fabrication process it is often necessary to transport cassettes filled with wafers to and from several different processing machines within a particular environment Depending on the types of chips being manufactured, the number and order of machines will vary. Thus a fixed transporation system, for example a continuous belt system may be impractical. Fixed belt systems may unduly crowd the workplace, creating difficulty with access to the equipment.

Accordingly, a preferred mode of wafer cassette transport within a fabrication clean room is a mobile transport unit (MTU), able to independently transfer the cassettes filled with wafers between machines as needed.

None of the prior art has addressed the issue of providing a independently operable, self-contained mobile transport unit able to operate within a particular isolated environment, and which is independently controllable, self-contained, and able to operate with sufficient precision to deliver cassettes filled with wafers to and from various machines without creating disturbances which would adversely effect the fabrication process.

SUMMARY OF THE PRESENT INVENTION

It is therefore an object of the present invention to provide a mobile transport unit which is independently operable.

It is a further object of the present invention to provide a mobile transport unit which can continously receive information from, and transmit information to, an external control source.

It is a further object of the present invention to provide a mobile transport unit which is entirely self-contained and requires no external connections.

It is a further object of the present invention to provide a mobile transport unit which is highly repeatable in operation, and which can continuously recalibrate itself to avoid cumulative errors.

Briefly, a preferred embodiment of the present invention comprises a rectangular-shaped mobile transport vehicle having a pair of front drive wheels mounted on a rotatable steering assembly, and a relatively fixed wheel mounted at opposing rear corners of the vehicle. The front rotatable steering assembly includes a drive motor, a steering motor for rotating the assembly, a rotary encoder and a gyroscope for monitoring and correcting a heading of the vehicle. The steering assembly is mounted to be rotatable about a vertical axis which is perpendicular to the vehicle's centerline and to a horizontal axis of rotation of the front wheels. A remote manipulator arm is mounted atop a front portion of the vehicle and has a vertical axis of rotation colinear with that of the front steering assembly.

A laser positioning system is also mounted about a front portion of the vehicle and is calibrated to locate the distance and approach angle of the vehicle's front vertical axis relative to a fixed piece of equipment within the operating environment of the vehicle.

A main vehicle computer, and an arm control computer are mounted within the vehicle and are coupled to various sensory and mechanical inputs and to the arm and vehicle drive motors, for controlling movements of the arm and vehicle. Power is supplied to the on-board equipment from a battery pack, mounted within a frame of the vehicle. In operation, the vehicle is covered by a smooth skin to isolate the vehicle components from the operating environment and to control airflow characteristics around the vehicle. Attached to the rear of the vehicle, is a cargo bay comprising a plurality of horizontally stacked cubicles for containing wafer cassettes. Mounted atop the cargo bay is an infrared communications transmitter/receiver module which is capable of receiving and transmitting intelligence signals from and to an external central control unit, via a plurality of fixed transmitter/receiver boxes mounted within the vehicle's operating environment. The infrared communications module comprises the primary mode of information transmission to the mobile vehicle; allowing it to receive instructions for equipment servicing. An operator interface board is also mounted about the vehicle for direct input and display of information and instructions. For safety purposes, the vehicle is designed to travel at a speed of about one foot per second. A plurality of ultrasonic transducers, mounted about the front of the vehicle, will shut down the drive motor upon detection of an obstacle in the vehicle's path. For wafer fabrication purposes, it is important to minimize airflow disturbance in the vacinity of the wafer processing equipment. This is aided by constructing a pair of cooling air inlets as horizontal slots, just under the cargo bay. A pair of cooling fans are mounted inside the vehicle and direct air over the computers and battery packs, and out through a pair of outlets located at floor level near the front wheels and the rear wheels.

It is an advantage of the present invention that the mobile unit is self-guided, and may operate continuously without the need for recaliberation.

It is another advantage of the present invention that it requires no connection to external power or guidance sources.

It is yet another advantage of the present invention that it is able to communicate with external sources to receive and to transmit information and is able to respond to information transmitted to it.

It is a further advantage of the present invention that it can operate within a clean room environment without disturbing the environment.

These and other objects and advantages of the present invention will no doubt become obvious to one of ordinary skill in the art after having read the following Detailed Description of the Preferred Embodiment which is illustrated in the various drawing figures.

IN THE DRAWINGS

FIG. 5(b) is a rear elevational view of the mobile transport unit of FIG. 1.

DETAILED DESCRIPTION OF THE PREFERRED EMBODIMENT

Figure 1:
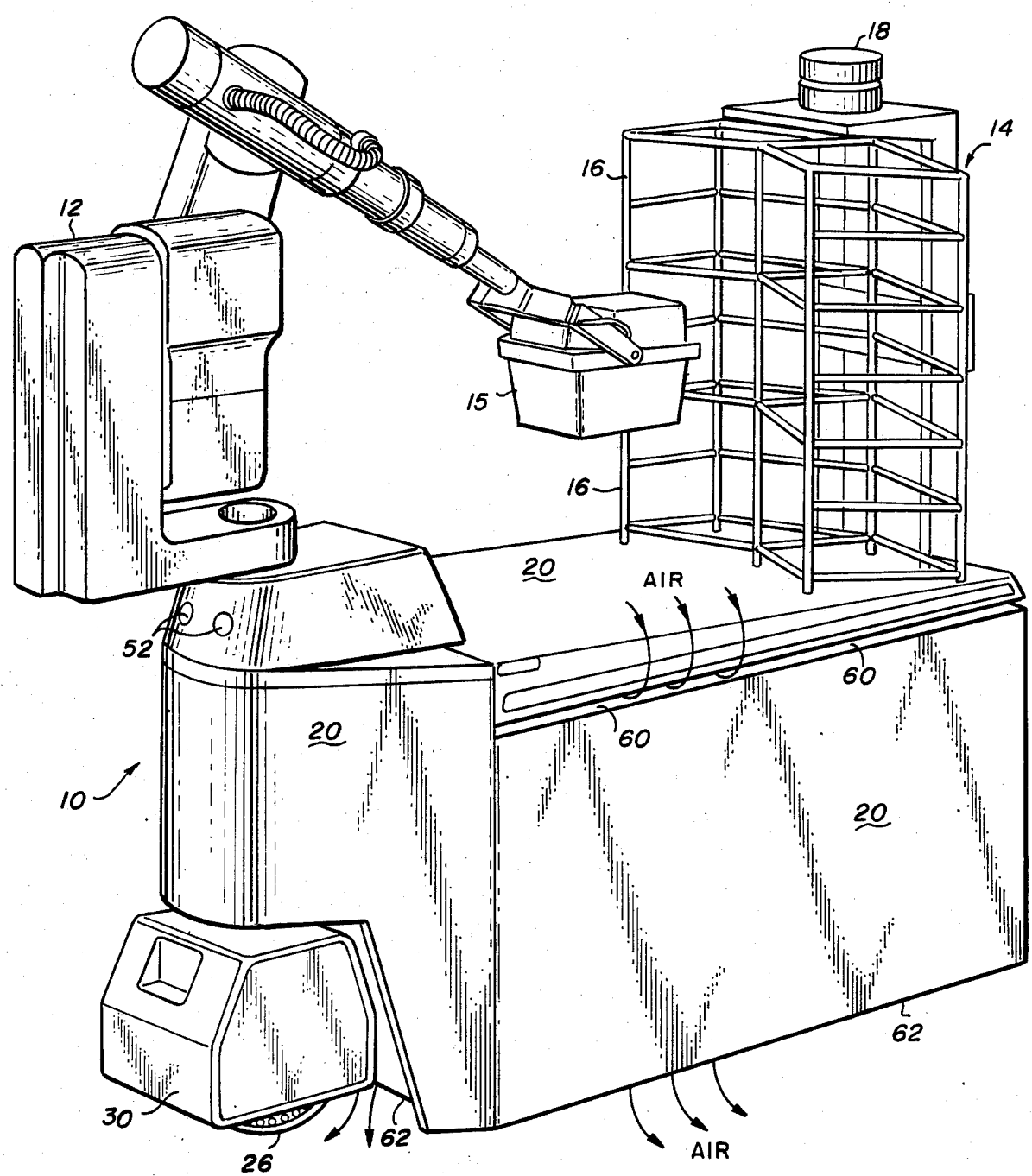
FIG. 1 is a perspective view of a mobile transport unit of the present invention, illustrating the unit in its operational form.
Figure 2:
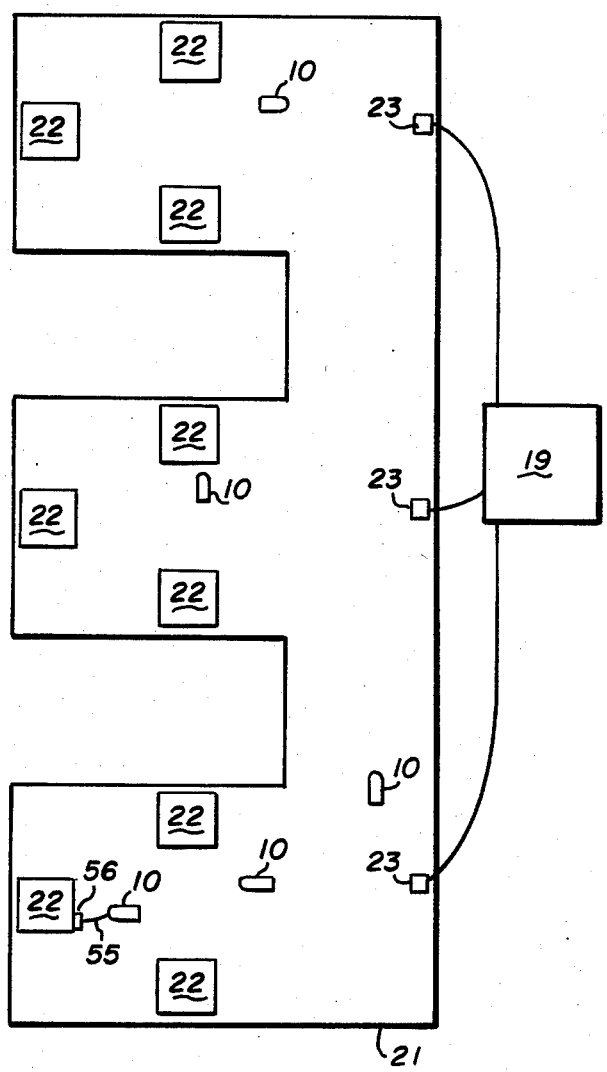
FIG. 2 is a schematic diagram of a wafer fabrication room within which the mobile transport unit of FIG. 1 may operate.
Figure 3:
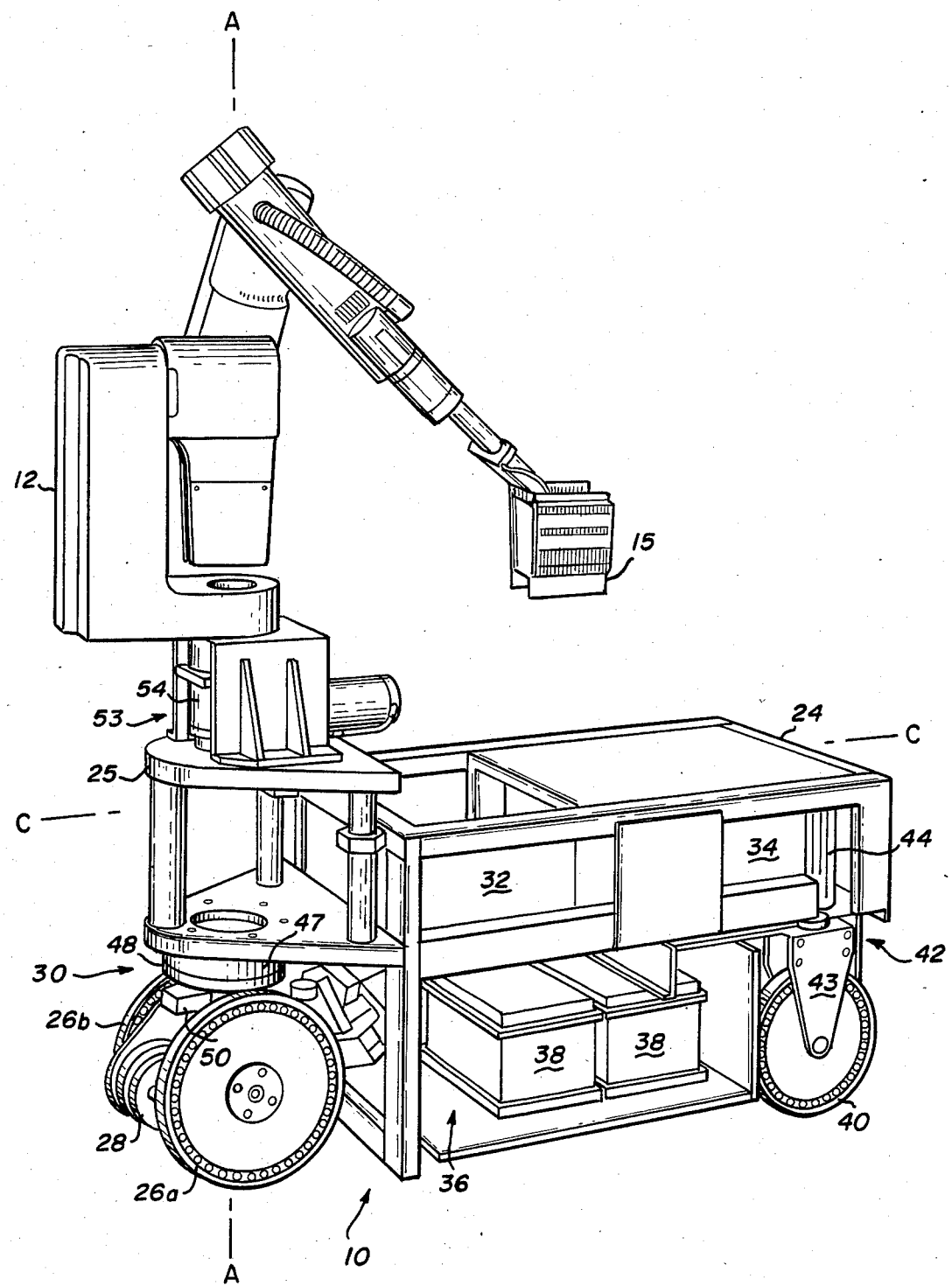
FIG. 3 is a perspective view of the mobile transport unit of FIG. 1 with the skin removed.

FIGS. 1 and 3 illustrate an overall perspective view of a mobile transport unit of the present invention and referred to by the general reference character 10. As illustrated, the unit 10 is adapted for use in a silicon wafer fabrication facility. The unit 10 includes a robotic arm assembly 12 mounted about its front portion. At the back of the unit 10 is a cargo bay 14 which is adapted for carrying a plurality of boxes 15, which may be, for example, wafer cassettes. The cargo bay 14 comprises a plurality of vertically arrayed cubicles 16, each having an open end wherein a box 15 may be inserted or from which it may be retrieved. Atop the cargo bay 14 is an infrared communications device 18 which is used for receiving communications from a central control unit 19 (shown schematically in FIG. 2) and for transmitting information to said unit 19 whereby operations of the mobile transport unit 10 may be controlled and monitored. Also shown in FIG. 1 is a protective skin 20 which is used to cover the mobile unit 10 to aid in cleanliness and to control air flow characteristics thereof.

FIG. 2 illustrates a possible layout of a wafer fabrication room 21 wherein a transportation unit 10 or plurality of units 10 may be operating. The room 21 includes a plurality of wafer fabrication machines 22 which require periodic servicing by the unit 10. Also within the room 21 are a plurality of infrared communications boxes 23 which are coupled to the central control unit 19 and provide means by which information is transmitted to, and received from, the unit 10. It may be noted that FIG. 2 is a schematic intended for illustration only. The actual configuration of the workplace may vary considerably.

Figure 4:
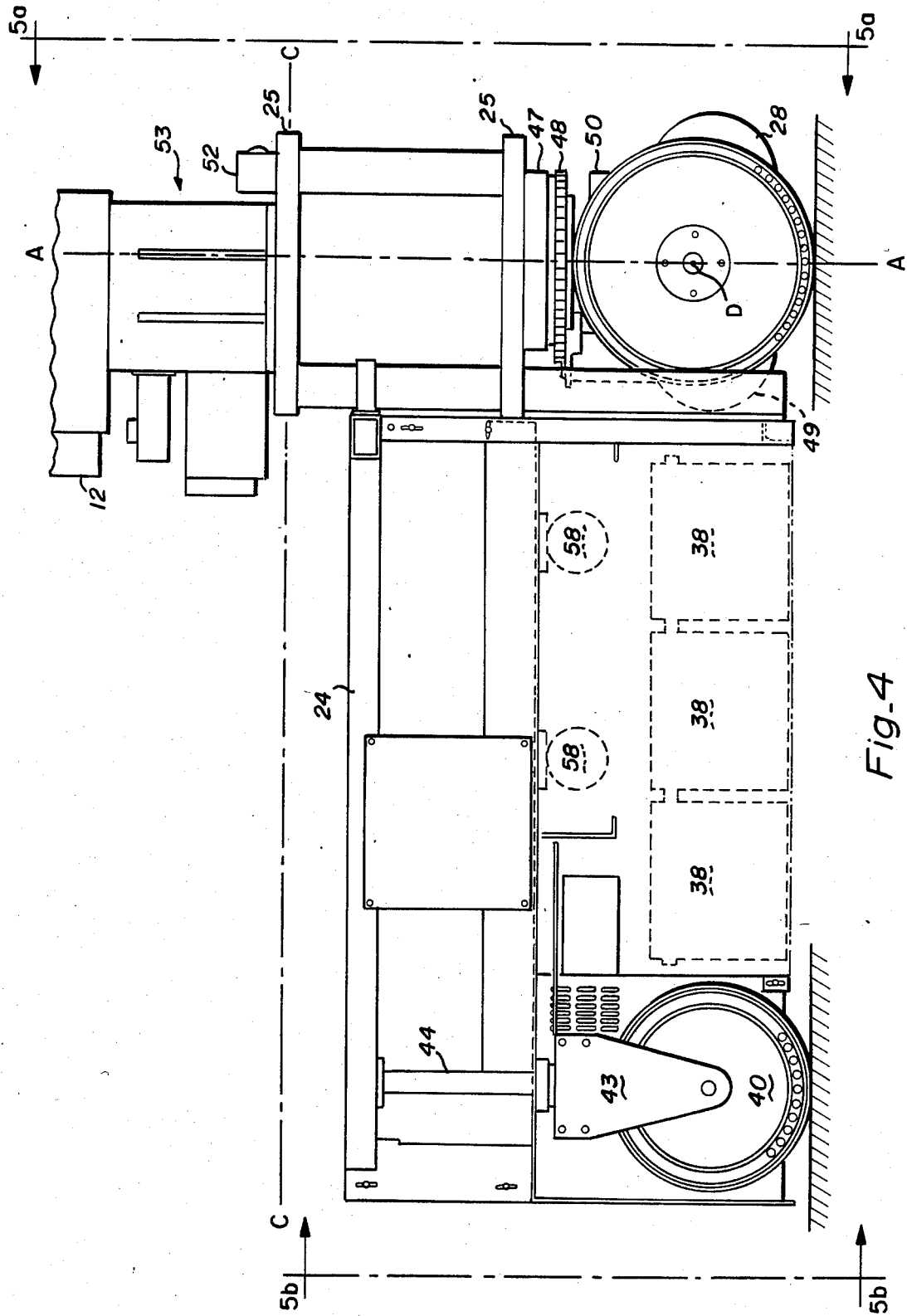
FIG. 4 is a side elevational view of the mobile transport unit of FIG. 1.
Figure 5A:
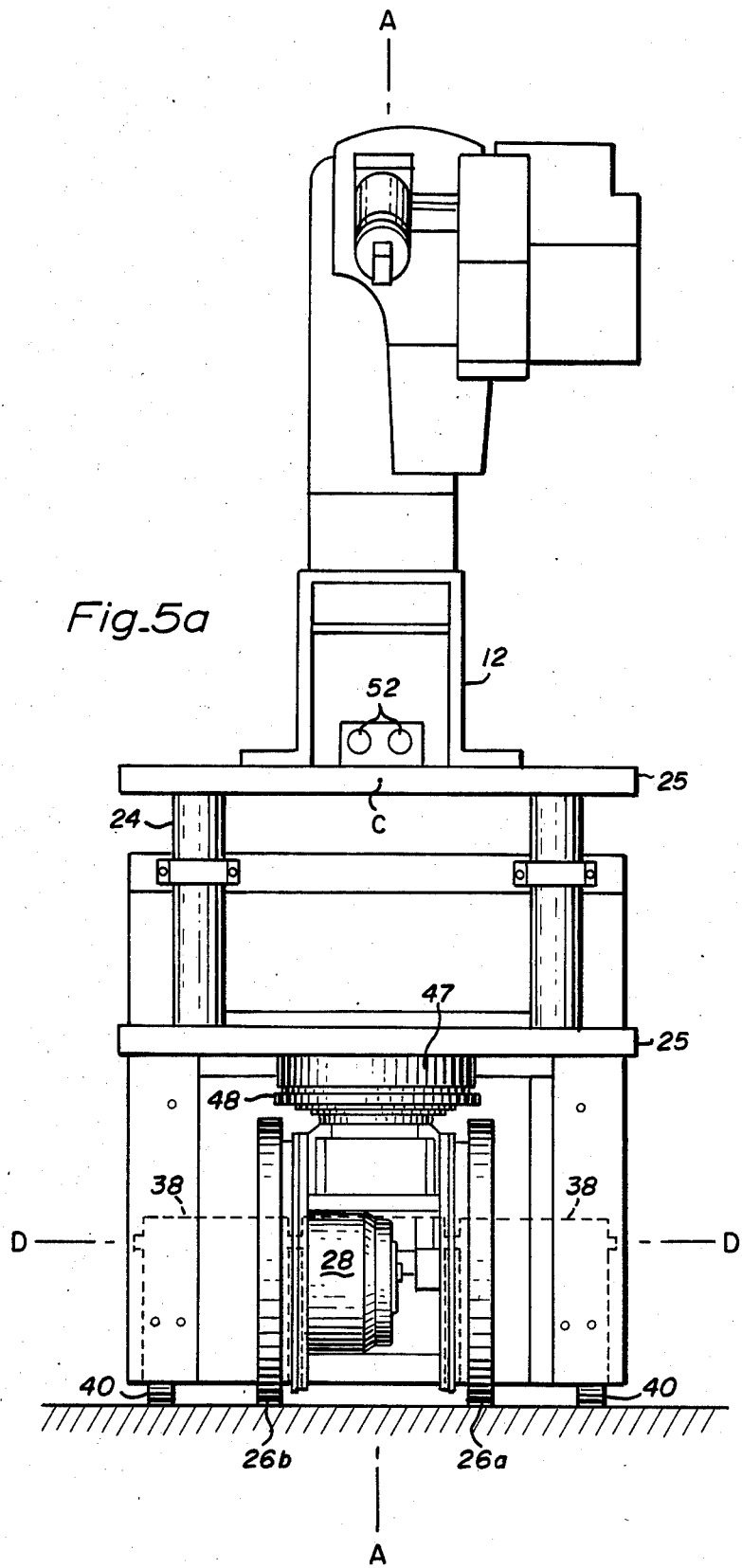
FIG. 5(a) is a front elevational view of the mobile transport unit.

FIGS. 3 and 4 illustrate the mobile transport unit 10 with the skin 20 removed so that the internal components may be seen. The unit 10 comprises a substantially rectangular chassis 24, to which a triangular arm support framework 25 is attached about a front end thereof. The arm 12 is mounted atop the arm support framework 25, and directly beneath the arm support framework 25 a pair of front drive wheels 26a and 26b are mounted. The two front drive wheels 26a and 26b, as well as a drive motor 28 are mounted about a steering assembly 30 which is revolvably secured to the underside of the arm support 25. These elements are also illustrated in front view in FIG. 5A. It may be noted that the assembly 30 is mounted to have a vertical axis of rotation A which is perpendicular to a vehicle centerline C. The axis of rotation A is thus the axis of rotation for the front drive wheels 26a and 26b which serve also to steer the unit. As shown in FIG. 5a, the lateral separation of the wheels 26a and 26b is bisected by the axis A, and an axis of rotation D of the wheels 26a and 26b is perpendicularly bisected by both the vertical axis A and the vehicle centerline C. The vertical axis A accordingly serves as a reference point for driving and steering the vehicle 10, and the vertical axis A further runs directly through a center of rotation of the arm 12, which simplifies positional computations of the arm 12 with respect to a machine 21 to which the unit 10 is docked.

Mounted within the chassis 24 are an arm computer 32, a main computer 34 and a battery pack 36, comprising a plurality of batteries 38. At each lateral rear corner of the frame 24, a rear wheel 40 is mounted to a castor assembly 42. The castor assemblies 42 each comprise a fork 43 to which the wheel 40 is secured, and a vertical spindle 44 secured at one end to the chassis 24 and at an opposite end to the fork 43. A plurality of bearings (not shown) are interposed between the forks 43 and wheels 40 and between the forks 43 and spindles 44 to reduce frictional engagement therebetween. The castor assemblies 42 allow for limited castoring of the rear wheels 40 which aid in maintaining a straight course when the vehicle 10 is backing up. To angularly change the position the rear wheels 40, a rear stepper motor 45 and optical encoder 46 (shown in FIG. 5b), are mechanically coupled to the castor assemblies 42 and electrically connected to the computer 34.

Directional control of the mobile transport unit 10, when driving in the forward direction, is accomplished via the front wheel steering assembly 30, and is regulated by the main computer 34. Motion of the steering assembly 30 about the vertical axis A is imparted by a steering stepper motor 47, coupled to the steering assembly 30 and to the frame 25, and illustrated in FIGS. 3 and 4. A continuous rotary encoder 48 is affixed to the arm support frame 25, and is adapted to rotate with the assembly 30 so that precise angular measurements from a vehicle centerline C may be taken and transmitted to the computer 34. Vehicle travel is sensed by means of a rotary encoder 49 affixed to the assembly 30 as shown in FIG. 4 and coupled to the wheels 26a and 26b to rotate therewith. The encoder 49 delivers electrical impulses to the main computer 34, allowing the computer 34 to determine the amount of travel of the wheels 26a and 26b.

Also part of the steering assembly 30 is a gyroscope 50. While a number of types of gyroscopes may be utilized to aid in directional control of the vehicle, in the mobile unit 10 the gyro 50 is a rate gyro and is used to compensate for mechanical errors in the system. The gyro 50 simply determines whether the unit 10 has deviated from a straight path, and the result of such determination is fed to the main computer 34 which in turn compensates for any deviation from the intended path by correcting a steering direction. The gyro 50 may be used to compensate for a number of variables, for example frictional differences of the floor on which the mobile unit 10 will operate, change in slope of the floor, and changing wheel radius of the wheels 26a, 26b and 40. The gyro 50 provides continuous data to the computer 34 to allow continuous correction of the vehicle steering direction.

The infrared communications module 18, mounted atop the cassette bay 14 as illustrated in FIG. 1, is the means by which the unit 10 communicates with the central control unit 19. While a number of communication devices may be successfully employed in conjunction with the mobile unit, in the mobile unit 10 the communications module 18 is an infrared communications module utilizing a frequency shift keying modulation technique to provide a diffuse communication system, and to enable each mobile transport unit 10 to be individually addressed. This module 18 is fully described in the co-pending U.S. patent application Ser. No. 692,110 and assigned to the assignee as the present invention, and is incorporated by reference herein. The infrared communications module 18 allows the unit 10 to receive information from the central communications unit 19 which in turn receives information from the workpiece machines 22 and thus may direct the mobile transport unit 10 to and from the machines 22 as needed. An operator interface module 51, including an information input keyboard, which is mounted to the vehicle chassis 24 as illustrated in FIG. 5b, may also be used to directly input information to the mobile transport unit 10 and may also include a display for directly communicating information therefrom.

Illustrated in FIGS. 1, 4 and 5a and mounted about the arm support frame 25 are a plurality of ultrasonic transducers 52 and associated circuitry for detecting obstacles in the path of the unit 10. The ultrasonic transducers 52 function as known in the art by emitting bursts of high frequency sound and measuring the time it takes to receive the reflected sound waves. For better short range detection, the unit 10 utilizes at least two ultrasonic sources 52. Also mounted about the front of the unit within the arm support frame 25 is a docking module 53 comprising a laser positioning system substantially as described in co-pending U.S. patent application Ser. No. 655,341 now U.S. Pat. No. 4,615,615, incorporated by reference herein and coinvented by the same inventors. The docking module 53 includes a laser (not shown) and a rotatably mounted mirror assembly 54 for directing a light beam 55, shown in FIG. 2, perpendicularly outward away from the unit 10 and perpendicular to the vertical axis A. The beam 55 is swept about an arc of about 270° in front of the vehicle 10 and during the docking process of the vehicle 10, the beam will impinge upon a corner reflector 56, shown schematically in FIG. 2, mounted about a machine 22. The beam 55 will be reflected back from the corner reflector 56 to the docking module 53 at exactly three points, and these are sensed by sensors and circuitry associated with the docking module 53. The docking module 53 is arrayed to have a central axis of rotation coaxial with the vertical axis A, thus positional determinations made by the docking module 53 are made relative to the central axis A which is the same axis for location of the arm 12 and the front wheels 26a and 26b. An output from the docking module 53 is communicated to the main computer 34 which may then compensate motion of the arm 12 for variations in the position to the unit 10 relative of the machine 22, and to correct any navigational errors accumulated during travel of the unit 10 from a previous docking point.

In operation, the unit 10 is covered by the smooth skin 20 which encloses the various elements within. Because the computers 34 and 32 as well as the batteries 38 require cooling, a pair of cooling fans 58, illustrated in phantom in FIG. 4, are secured within the chassis 24 and direct air over the computers 32 and 34, and the batteries 38. FIG. 1 illustrates a series of inlets 60 for such cooling air. The inlets 60 are horizontal slots on either side of the unit 10 and just below the cargo bay 14. Spent air is exhausted at floor level via outlets 62 near the steering assembly 30 and at the sides of the unit 10.

Operation of the mobile unit 10 is as follows. The unit 10 receives intelligence signals via the infrared communications module 18 from the central control unit 19 directing the mobile unit 10 to service a particular machine 22. Information is downloaded into the mobile unit's main computer 34 from the central control unit 19. This information includes path information appropriately directing the mobile unit 10 to the desired machine 22. The mobile unit computer 34 activates the directional motor 47 to orient the front steering assembly 30 in the direction that the unit 10 has been commanded to go. The drive motor 28 is then energized, imparting forward motion to the unit 10. To keep the unit aligned with an intended direction of travel, the onboard computer 34 constantly readjusts the angle of the steering assembly 30 relative to the unit centerline C as the mobile unit proceeds forward, and the main body of the unit 10 trails the steering assembly 30. The geometry of the steering assembly 30 is computed and adjusted according to the following equation:

$$\theta = \sin^{-1}\{2e^{1/d}/[1+(e^{1/d})^2]\}$$

As the unit 10 travels forward, the gyro 50 senses any deviation from the intended path of the unit 10 and provides an output of such deviation in degrees per second to the main computer 34. The computer 34 then uses this information to modify an intended steering direction.

When the unit 10 arrives at the machine 22, it stops in accordance with preprogrammed instructions downloaded from the system central control unit 19. At this point the docking module 54 will scan the corner reflector 56 mounted about the machine 22, and provide an exact determination of the position of the mobile unit 10 relative to the machine 22. If this position varies from the expected position, the mobile unit central computer 34 directs the arm computer 32 to adjust the motion of the arm accordingly based on an X-Y coordinate system, and if necessary to change an approach angle of the arm 12. Once the unit 10 is docked at the appropriate machine 22, the arm 12 may be utilized for example, to transfer a wafer cassette 15 from the cargo bay 14 of the mobile unit 10 to the machine 22 or vice versa as needed. Depending on the approach angle of the mobile unit 10 to the machine 22, after servicing the machine 22 the mobile unit 10 may simply continue on its original heading, or it may be necessary to reverse the machine 10 and orient it on a different heading. To back up the mobile unit 10, the front steering assembly 30 is locked so that the front wheels 26a and 26b are parallel with the centerline C. The drive motor 28 is energized in the reverse direction, causing the unit 10 to back away from the machine 28. During this manuever, minor angular adjustments of the rear wheels 40 can be made by the rear stepper motor 45 to ensure that the unit backs away in a straight line. When the unit is clear of the machine 22, it is stopped, and the front wheel assembly 30 is oriented towards the new heading as directed by the system's central control unit.

Various specific implementations of the mobile unit 10 are possible and may be created depending upon the specific environmental condition in which the unit is to operate. The unit 10 is adapted to operate in a clean room environment of a wafer fabrication plant, consequently it is designed with cleanliness and safety factors in mind. To facilitate safety, the unit moves at a speed of approximately one foot per second, and is equipped with the ultrasonic obstacle detection sensors 52 which automatically stop the unit at preselected distance from an obstacle in the unit's direction of travel. The unit is formed of and covered with smooth-surfaced materials to improve cleanliness and to facilitate smooth airflow over and around the unit.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

The invention claimed is:

1. A mobile transport unit comprising:
   a chassis, adapted for transporting a robot manipulator arm;
   a front and rear wheel means, mounted about the chassis whereby the chassis may freely roll thereon, said front wheel means being mounted to a steering assembly mounted to rotate about a vertical axis, said assembly including a drive motor for supplying rotary motion to said front wheel means, said assembly further including a steering notor for rotating said assembly about said vertical axis whereby a heading of said assembly may be changed, said assembly further including a rotary encoder coupled thereto for supplying positional informational of the assembly relative to a predetermined axis of the transport unit, and a distance encoding means for measuring a vehicle travel distance from a predetermined point, said rear wheel means being independently secured to opposing lateral rear portions of the vehicle;
   at least one central control computer means, electronically coupled to said rotary encoder, to said distance encoding means and to said drive and said steering motors;
   a diffuse infrared communication means, mechanically attached to the unit and electrically coupled to the computer means and in diffuse infrared communication with an extra vehicular information and control source for directing and controlling the unit;
   a laser docking and positioning means for locating a predetermined point of the unit relative to a fixed piece of equipment to and from which the vehicle will shuttle; and
   a power supply means coupled to said drive and steering motors, and to said control means and mounted within said chassis.

2. The mobile transport unit of claim 1 and further including:
   a gyroscope, coupled to said steering assembly and electrically coupled to said conttol means, the gyroscope being adapted to determine a deviation of the unit from a preselected heading.

3. The mobile transport unit of claim 1 and further including:
   at least one ultrasonic sensing means affixed to the vehicle chassis about a front end thereof and electronically coupled to the control means, said ultrasonic sensors being adapted for detecting an obstacle in the path of the unit.

4. The mobile transport unit of claim 1 wherein;
   said robotic manipulator comprises a six axis robotic arm, and an arm control means electronically coupled thereto.

5. The mobile transport unit of claim 1 wherein;
   the diffuse infrared communications means comprises a transmitter/reciver for communicating with a transmitter/receiver within an environment in which the unit is to operate, each transmitter/receiver being capable of transmitting and receiving infrared signals utilizing a frequency shift keying encoding format.

6. The mobile transport unit of claim 1 wherein,
   the laser docking and positioning means comprises a vehicle mounted laser light source, a rotating mirror assembly for directing a light beam therefrom about an arc in front of the mobile transport unit, an encoder means for sensing angular rotation of the mirror assembly, a detector means fqr detecting a reflected light beam, a microprocessor means coupled to said encoder means and said detector means for correlating angular position of the mirror assembly with said reflected light beam and for computing a position and heading therefrom; and
   a corner reflector means for mounting to said fixed piece of equipment.

7. A mobile transport unit comprising:
   a rectangular shaped chassis, adapted for mounting a robotic manipulator arm;
   a first and a second rear wheel mounted to the chassis at opposing rear lateral ends thereof to be vertically pivotable such that said wheels may deviate from a vehicle center line;
   a front steering assembly being pivotably mounted about a vertical axis whereby said assembly may be rotated relative to said vehicle center line, the assembly including a pair of horizontally mounted front wheels, said front wheels being coupled to a drive motor for supplying rotary motion thereto, the assembly further including a steering motor for rotating the assembly about said vertical axis whereby a heading of the assembly may be changed, the assembly further including a rotary encoder means coupled thereto for measuring angular deviations of the assembly from a fixed reference point on the unit, the assembly further including a gyroscope means coupled thereto for measuring a deviation from a predetermined heading and a distance measuring means for measuring rotational motion of said front wheels about said horizontal axis whereby a distance travelled by the unit from a predetermined starting point may be measured;
   at least one computer means mounted within the chassis and electrically coupled to said rotary encoder means, said distance measuring means, said drive and said steering motors, for directing the operation of said drive and said steering motors;

a diffuse optical communication system mounted to said chassis, electrically coupled to the computer means and in communication with an extra-vehicular information and control means for directing and controlling the mobile transport unit;

a docking module mounted to said chassis about a front portion thereof and including a laser light source means and a rotary reflecting means for directing a beam of light from said laser light source means, said rotary reflecting means having a central axis of rotation colinear with said axis of rotation of said steering assembly, said rotatable reflecting means adapted for directing said beam perpendicularly to said vertical axis and about an arc in front of the mobile transport unit, said beam being adapted for reflecting from a fixed reflector attached to a fixed point, said docking module including sensing means for sensing said reflective light whereby a triangulation may be obtained and a position of the mobile transport unit relative to said fixed point may be calculated;

a collision avoidance means affixed to said chassis about a front end thereof and comprising at least one ultrasonic transducer and receiver for sending and receiving high frequency sound waves, whereby an object appearing a predetermined distance in front of the transport unit may be detected, the collision avoidance means being electrically coupled to the computer means;

an internal power supply means comprising a plurality of batteries mounted to said chassis and coupled to said drive and steering motors, said computer means, and said robotic arm for supplying electrical power thereto;

a cargo bay for receiving and transporting a plurality of wafer cassettes, said cargo bay comprising a vertical arrangement of a plurality of shelves wherein said wafer cassetes may be stored and from which said wafer cassettes may be retrieved by said robotic arm; and a plurality of protective skins affixed to the chassis to enclose the internal components thereof whereby the possibilities of contamination are reduced and air flow characteristics are improved to prevent turbulence around said wafer cargo bay and said robotic arm.

8. The mobile transport unit of claim 7 wherein, the diffuse optical communications system comprises an infrared transmitter/receiver and associated circuitry for encoding and decoding information utilizing a frequency shift-keying technique, and the extra-vehicular information and control means comprises at least one fixed infrared transmitter/receiver and an associated central control unit for the control thereof.

* * * * *